United States Patent

Nishimura

[11] Patent Number: 5,862,105
[45] Date of Patent: Jan. 19, 1999

[54] INFORMATION RECORDING METHOD CAPABLE OF VERIFYING RECORDED INFORMATION SIMULTANEOUSLY WITH RECORDING, AND MAGNETO-OPTICAL RECORDING MEDIUM USED IN THE METHOD

[75] Inventor: Naoki Nishimura, Tokyo, Japan

[73] Assignee: Canon Kabushiki Kaisha, Tokyo, Japan

[21] Appl. No.: 821,409

[22] Filed: Mar. 21, 1997

Related U.S. Application Data

[62] Division of Ser. No. 404,329, Mar. 15, 1995, abandoned.

[30] Foreign Application Priority Data

Mar. 16, 1994 [JP] Japan .................................. 6-045592

[51] Int. Cl.⁶ .................................................. G11B 11/00
[52] U.S. Cl. ...................... 369/13; 369/116; 428/694 EC
[58] Field of Search ........................... 369/13, 14, 275.2, 369/275.3, 116, 110, 288, 283; 360/59, 114; 428/694 MM, 649 ML, 694 EC, 64.3

[56] References Cited

U.S. PATENT DOCUMENTS

| 5,278,810 | 1/1994 | Takahashi et al. ......................... 369/13 |
| 5,317,555 | 5/1994 | Takahashi et al. ....................... 369/110 |
| 5,428,585 | 6/1995 | Hirokane et al. .......................... 369/13 |
| 5,428,586 | 6/1995 | Kobayashi et al. ........................ 369/13 |
| 5,452,272 | 9/1995 | Murakami et al. ........................ 369/13 |
| 5,486,395 | 1/1996 | Murakami et al. ..................... 428/64.3 |
| 5,623,458 | 4/1997 | Matsumoto et al. ....................... 369/13 |

FOREIGN PATENT DOCUMENTS

| 258978A2 | 3/1988 | European Pat. Off. . |
| 0522500 | 1/1993 | European Pat. Off. . |
| 0523944 | 1/1993 | European Pat. Off. . |
| 0586122 | 3/1994 | European Pat. Off. . |
| 0586175 | 3/1994 | European Pat. Off. . |
| 3-93058 | 4/1991 | Japan . |
| 3-207040 | 10/1991 | Japan . |
| 5-20720 | 1/1993 | Japan . |
| 5-182269 | 7/1993 | Japan . |

*Primary Examiner*—Ali Neyzari
*Attorney, Agent, or Firm*—Fitzpatrick, Cella, Harper & Scinto

[57] ABSTRACT

A magneto-optical recording medium includes a substrate, a reproducing layer formed on the substrate, a recording layer formed on the reproducing layer, and an intermediate layer formed between the reproducing layer and the recording layer. The reproducing layer has an in-plane magnetization film at room temperature. The recording layer has a Curie temperature lower than that of the reproducing layer. The intermediate layer has a Curie temperature lower than those of the reproducing layer and the recording layer. The reproducing layer changes to a perpendicular magnetization film at a temperature between room temperature and the Curie temperature of the intermediate layer.

3 Claims, 10 Drawing Sheets

TEMPERATURE DISTRIBUTION IN TRACK CENTER

TEMPERATURE DISTRIBUTION
IN TRACK CENTER

TEMPERATURE DISTRIBUTION
IN TRACK CENTER

TEMPERATURE DISTRIBUTION
IN TRACK CENTER

INFORMATION RECORDING METHOD CAPABLE OF VERIFYING RECORDED INFORMATION SIMULTANEOUSLY WITH RECORDING, AND MAGNETO-OPTICAL RECORDING MEDIUM USED IN THE METHOD

This application is a divisional of application Ser. No. 08/404,329, filed Mar. 15, 1995, now abandoned.

BACKGROUND OF THE INVENTION

1. Field of the Invention

The present invention relates to a magneto-optical recording medium and a magneto-optical recording method, in which information is recorded by forming bits of reversed magnetic domains using a laser beam and an external magnetic field, and the information is read out by utilizing a magneto-optical effect by irradiating a polarized laser beam and, more particularly, to a magneto-optical recording medium and a recording method, which can improve the data transfer rate by verifying recorded information simultaneously with information recording.

2. Related Background Art

As a rewritable high-density recording system, a magneto-optical recording medium on which information is recorded by writing magnetic domains in a magnetic thin film using thermal energy of a semiconductor laser, and from which the information is read out using a magneto-optical effect, has received a lot of attention.

In recent years, a demand has arisen for increasing the recording speed of the magneto-optical recording medium.

In the magneto-optical recording method, the most basic technique of rewriting information includes the following three processes performed on a rotating disk-shaped recording medium.

(1) A DC external magnetic field is applied in an erasing direction, and a continuous laser beam is irradiated onto a position to be subjected to recording, thereby erasing old information.

(2) A DC external magnetic field is applied in a recording direction, and a laser beam modulated in accordance with recording information is irradiated onto the position to be subjected to recording, thereby recording information.

(3) Finally, a continuous weak laser beam is irradiated onto the position to be subjected to recording to read out recorded information, and it is confirmed if the information is normally recorded (verifying operation).

In the magneto-optical recording medium, since information cannot often be normally recorded due to defects, deterioration, or corrosion of the recording medium, dust, failure of a magneto-optical recording apparatus, and the like, the verifying operation of recorded information in process (3) is indispensable.

As can be seen from the above description, rewriting information requires the time it takes for three revolutions of the disk. If this operation can be achieved by two revolutions of the disk or one revolution of the disk, a high-speed processing upon rewriting information can be realized.

In order to achieve this, various methods have been proposed. For example, in order to simultaneously perform processes (1) and (2) (i.e., perform them in one revolution of the disk), a method of irradiating a continuous laser beam under an external magnetic field modulated according to recording information (magnetic field modulation overwrite), a method of irradiating a laser beam which is modulated to high and low levels in accordance with recording information under a DC external magnetic field using a special medium (optical modulation overwrite), and the like have been proposed.

In order to perform process (3) simultaneously with processes (1) and (2), a method in which two laser beams are used in a single optical system, so that recording is performed by the first beam, and recorded information is verified by the second beam, has been proposed. When all the above-mentioned methods are used, processes (1), (2), and (3) can be completed within one revolution of the disk.

When the verifying operation of recorded information in process (3) is achieved by using two laser beams in a single optical system, the optical system is complicated. In addition, since the optical system requires high mechanical precision, it becomes bulky and complex, and its cost increases.

Thus, a method of performing the verifying operation in process (3) simultaneously with the magnetic field modulation overwrite using a single laser beam, thereby completing processes (1), (2), and (3) within one revolution of the disk, has been disclosed. For example, Japanese Laid-Open Patent Application No. 3-207040 or 5-20720 has proposed a method in which a magneto-optical recording medium comprising a two-layered magnetic film is used, and the verifying operation of recorded information is performed simultaneously with recording using light reflected by a magnetic layer having a high Curie temperature. On the other hand, Japanese Laid-Open Patent Application No. 5-182269 has proposed a method of similarly performing the verifying operation simultaneously with recording by arranging an intermediate layer with a low Curie temperature between a reproducing layer and a recording layer.

In recent years, a demand has arisen for a large-capacity recording medium by increasing the recording density in addition to an increase in recording speed of the magneto-optical recording medium. In order to meet such a demand, a technique for improving the recording density by magnetic super-resolution by modifying the structure of the recording medium and the reading method has been developed. For example, Japanese Laid-Open Patent Application No. 3-93058 has proposed to increase the line recording density and the track density in such a manner that a medium comprising a reproducing layer and a recording layer is used, and after the direction of magnetization of the reproducing layer aligns in one direction using an initialization magnetic field before reproduction of a signal, a signal held on the recording layer is transferred to the reproducing layer while applying a reproduction magnetic field so as to reduce any intersymbol interference upon reproduction, thus allowing reproduction of a signal having a period equal to or smaller than the diffraction limit of light.

However, with the above-mentioned verifying method, it is difficult to perform a reliable verifying operation, and to reproduce information recorded at a high density. The reasons for these problems will be explained below.

FIGS. 1A to 1C respectively show the light spot, magnetization state, and temperature distribution obtained when the verifying operation described in Japanese Laid-Open Patent Application No. 3-207040 or 5-20720 is performed. FIGS. 2A to 2C respectively show the light spot, magnetization state, and temperature distribution obtained when the verifying method described in Japanese Laid-Open Patent Application No. 5-182269 is executed. FIGS. 1A and 2A show a generally circular light spot incident on a recording track, with an old information detection region being shaded and a new information detection region being unshaded.

As shown in FIGS. 1B, 1C or 2B, 2C, the temperature distribution formed upon irradiation of a laser beam onto a magneto-optical recording medium normally extends in the traveling direction of a medium. FIGS. 1B or 2B show a laser beam incident on a reproducing layer side, while a recording magnetic field is incident on the recording layer side of the medium. More specifically, the temperature of a medium portion in a region, opposite to the medium traveling direction, in the light spot does not rise very much. It is difficult to raise the temperature of this low-temperature region to a temperature near the Curie temperature of the recording layer due to the upper limits of the thermal diffusion rate in the medium and the laser power. Therefore, the light spot always includes a region where the temperature of the recording layer portion does not reach its Curie temperature, as shown in FIGS. 1B or 2B, and magnetization of old information remains in this recording layer portion.

In order to realize a state wherein the direction of magnetization of the reproducing layer aligns in the direction of an external magnetic field to form a magnetic wall at an interface with the recording layer while the reproducing layer and the recording layer have interface magnetic wall energies high enough to apply an exchange coupling force capable of magnetic transfer therebetween, a magnetic field as large as 3 kOe or more is normally required as the external magnetic field. For this reason, the magneto-optical recording apparatus must have a large-size magnet, and it is impossible for a floating type magnetic head, normally used in the magnetic field modulation overwrite, to apply such a large magnetic field.

For this reason, in the magneto-optical recording medium and the verifying method described in Japanese Laid-Open Patent Application No. 3-207040 or 5-20720, an exchange coupling force acts between the reproducing layer and the recording layer in the low-temperature region in the light spot, thus forming a region where old information is transferred to the reproducing layer, as shown in FIG. 1B. Therefore, as shown in FIG. 1A, when the track width is decreased, the old information is detected simultaneously with new information as well as information or neighboring tracks in the verifying operation. For this reason, it is difficult to obtain a reliable verification signal. Furthermore, with this method, it is almost impossible to simultaneously realize the super-resolution effect.

In the magneto-optical recording medium and the verifying method described in Japanese Laid-Open Patent Application No. 5-182269, as well, since old information is detected in the low-temperature region before the temperature of the intermediate layer reaches its Curie temperature, as shown in FIG. 2A showing old and new information detection regions, and in FIG. 2B showing the magnetization state, it is difficult to obtain a reliable verification signal. With this method, although the super-resolution effect for increasing the line recording density can be realized, it is impossible to increase the recording density in the track direction, and the magneto-optical recording apparatus becomes complicated.

Furthermore, in the method of Japanese Laid-Open Patent Application No. 3-93058 proposed as a method of realizing the super-resolution, an initial magnetic field as large as about 3 kOe before reproduction, and a reproduction magnetic field are required, resulting in a bulky, high-cost magneto-optical recording apparatus.

SUMMARY OF THE INVENTION

The present invention has been made to solve the above-mentioned problems, and has as its object to provide a super-resolution magneto-optical recording medium which can greatly reduce crosstalk with old information upon overwrite recording, and can obtain a reliable verification signal simultaneously with recording, and an information recording method using the medium.

In order to achieve the above object, there is provided a magneto-optical recording medium comprising:

a substrate;

a first magnetic layer which is formed on the substrate and has an in-plane magnetization film at room temperature;

a second magnetic layer which is formed on the first magnetic layer and has a Curie temperature lower than a Curie temperature of the first magnetic layer; and a third magnetic layer which is formed between the first and second magnetic layers, and has a Curie temperature lower than the Curie temperatures of the first and second magnetic layers, wherein the first magnetic layer changes to a perpendicular magnetization film at a temperature between room temperature and the Curie temperature of the third magnetic layer.

In order to achieve the above object, there is also provided a method of recording information on a magneto-optical recording medium, which comprises:

a substrate;

a first magnetic layer which is formed on the substrate and has an in-plane magnetization film at room temperature;

a second magnetic layer which is formed on the first magnetic layer and has a Curie temperature lower than a Curie temperature of the first magnetic layer; and a third magnetic layer which is formed between the first and second magnetic layers, and has a Curie temperature lower than the Curie temperatures of the first and second magnetic layers, and in which the first magnetic layer changes to a perpendicular magnetization film at a temperature between room temperature and the Curie temperature of the third magnetic layer, the method comprising the steps of:

irradiating a recording laser spot, wherein the first magnetic layer has an inplane magnetization in a low-temperature region in the spot, and the first magnetic layer has a perpendicular magnetization and a temperature of the third magnetic layer exceeds a Curie temperature to cut off exchange coupling between the first and second magnetic layers in a high-temperature region of the spot;

applying an external magnetic field modulated according to recording information to record information in the second magnetic layer, and orienting a direction of magnetization, in the high-temperature region, of the first magnetic layer in a direction of the external magnetic field; and verifying the information by detecting reflected light, from the medium, of the recording laser spot.

BRIEF DESCRIPTION OF THE DRAWINGS

FIGS. 1A to 1C are views showing an example of a recorded information verifying method for a conventional magneto-optical recording medium, in which FIG. 1A is a view showing an old information mask region and a new information detection region in a light spot, FIG. 1B is a view showing the states of the directions of magnetization of respective layers, and FIG. 1C is a graph showing the temperature distribution in the track direction;

FIGS. 2A to 2C are views showing another example of a recorded information verifying method for a conventional magneto-optical recording medium, in which FIG. 2A is a view showing an old information mask region and a new information detection region in a light spot, FIG. 2B is a view showing the states of the directions of magnetization of respective layers, and FIG. 2C is a graph showing the temperature distribution in the track direction;

FIGS. 4A to 4C are views showing another example of a recorded information verifying method for the magneto-optical recording medium of the present invention, in which FIG. 4A is a view showing an old information mask region and a new information detection region in a light spot, FIG. 4B is a view showing the states of the directions of magnetization of respective layers, and FIG. 4C is a graph showing the temperature distribution in the track direction;

FIGS. 5A to 5C are views showing an example of a reproduction method for the magneto-optical recording medium of the present invention, in which FIG. 5A is a view showing a mask region and an aperture region in a light spot, FIG. 5B is a view showing the states of the directions of magnetization (spins) of respective layers, and FIG. 5C is a graph showing the temperature distribution in the track direction;

FIGS. 6A to 6C are views showing another example of a reproduction method for the magneto-optical recording medium of the present invention, in which FIG. 6A is a view showing a mask region and an aperture region in a light spot, FIG. 6B is a view showing the states of the directions of magnetization (spins) of respective layers, and FIG. 6C is a graph showing the temperature distribution in the track direction;

FIGS. 8A to 8C are waveform charts showing the measurement results of an example of the verifying operation of the magneto-optical recording medium of the present invention, in which FIG. 8A is a waveform chart showing the reproduced signal waveform of old information (4 MHz), FIG. 8B is a waveform chart showing the modulated magnetic field waveform of new information (10 MHz), and FIG. 8C is a waveform chart showing the verification signal;

FIGS. 9A to 9C are waveform charts showing the measurement results of another example of the verifying operation of the magneto-optical recording medium of the present invention, in which FIG. 9A is a waveform chart showing the reproduced signal waveform of old information (9 MHz), FIG. 9B is a waveform chart showing the modulated magnetic field waveform of new information (6 MHz), and FIG. 9C is a waveform chart showing the verification signal;

DETAILED DESCRIPTION OF THE PREFERRED EMBODIMENTS

A magneto-optical recording medium according to the present invention and an information recording/reproduction method using the medium will be described in detail below with reference to the accompanying drawings.

Figure 1A:
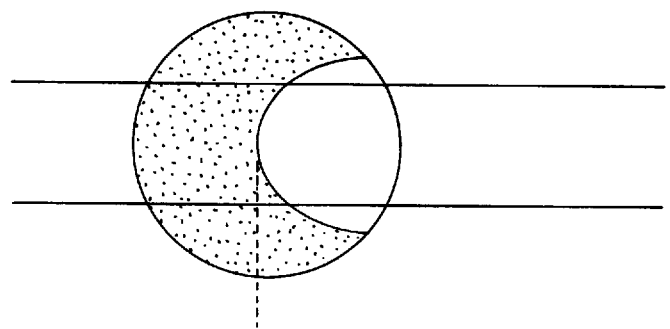
Figure 1B:
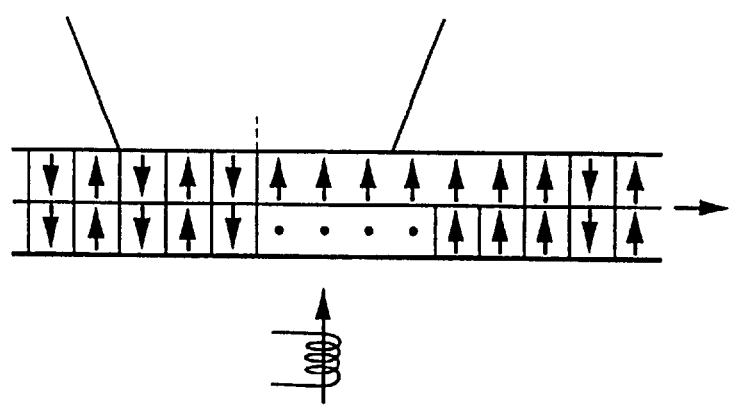
Figure 1C:
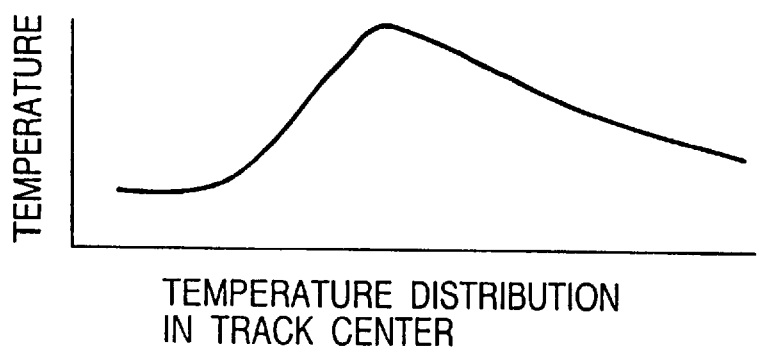
Figure 2A:
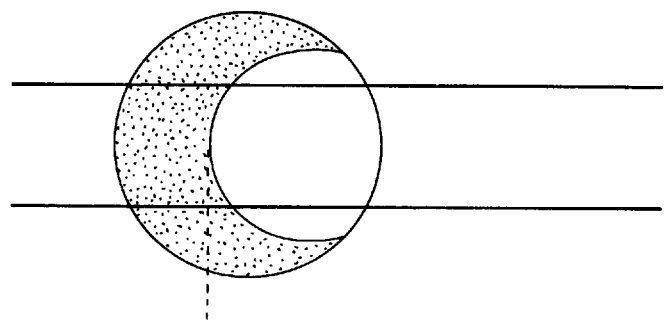
Figure 2B:
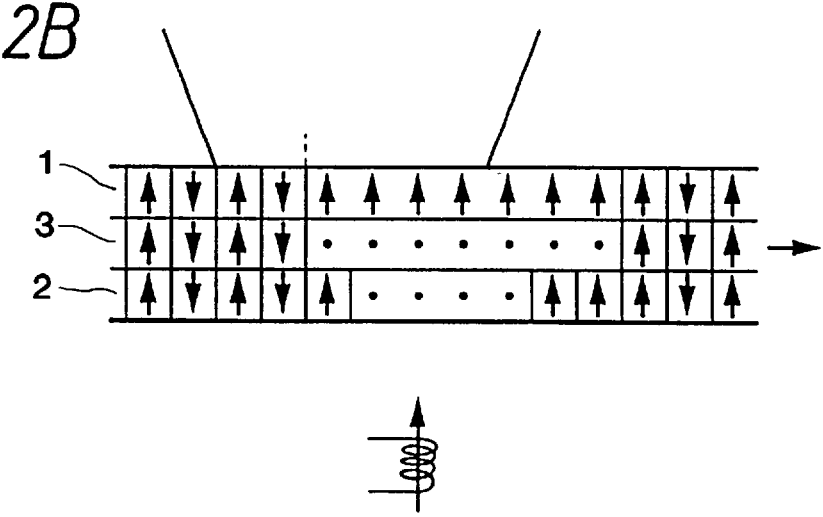
Figure 2C:
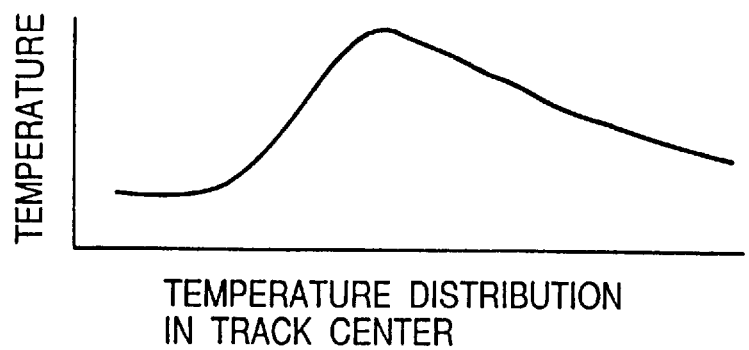
Figure 3:
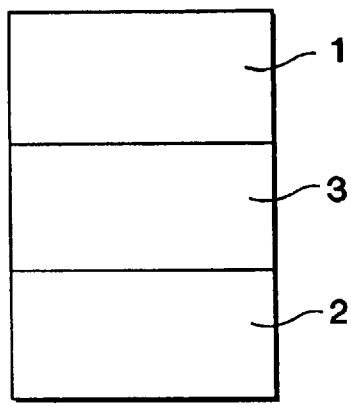
FIG. 3 is a sectional view showing the basic arrangement of magnetic layers of a magneto-optical recording medium according to the present invention.

A magneto-optical recording medium of the present invention has, on a substrate, at least three magnetic layers, i.e., a first magnetic layer which has an in-plane magnetization film at room temperature and changes to a perpendicular magnetization film when the temperature rises, a second magnetic layer which always has a perpendicular magnetization film, and has a Curie temperature lower than that of the first magnetic layer, and a third magnetic layer which has a Curie temperature lower than those of the first and second magnetic layers (FIG. 3). In the following description, the first magnetic layer will be referred to as a reproducing layer 1, the second magnetic layer will be referred to as a recording layer 2, and the third magnetic layer will be referred to as an intermediate layer 3.

The composition of the reproducing layer 1 is selected so that the reproducing layer 1 has an in-plane magnetization film at room temperature and becomes a perpendicular magnetization film at high temperatures. For this purpose, a composition which has a compensation temperature between room temperature and the Curie temperature is selected to have a large saturation magnetization (Ms) at room temperature and a small saturation magnetization (Ms) at the reproducing temperature. In this case, although the reproducing layer 1 has an in-plane magnetization film at room temperature, since the demagnetizing field energy (2 $\pi Ms^2$) is large, the Ms becomes small at the reproducing temperature, perpendicular magnetization anisotropy energy becomes dominant compared to the demagnetizing field energy, and the reproducing layer 1 becomes a perpendicular magnetization film.

As the material of the reproducing layer 1, a rare earth-iron family amorphous alloy such as GdCo, GdFeCo, GdTbFeCo, GdDyFeCo, NdGdFeCo, or the like is preferable. By "iron family" is here meant the elements iron, cobalt, and nickel. Also, the Kerr rotation angle at the short-wavelength side may be increased by adding a light rare earth element such as Nd, Pr, Sm, or the like.

The Curie temperature of the reproducing layer 1 is set to be at least 250° C. or higher, and preferably, 300° C. or higher since it must be higher than those of the recording layer 2 and the intermediate layer 3, and the reproducing layer 1 must have a Kerr rotation angle sufficient for the verifying operation upon recording.

The recording layer 2 preferably has a composition which has a large perpendicular magnetization anisotropy and can stably hold a magnetization state. For example, a rare earth-iron family amorphous alloy such as TbFeCo, DyFeCo, TbDyFeCo, or the like; garnet; a platinum family-iron family periodic structure film such as Pt/Co, Pd/Co, or the like; a platinum family-iron family alloy such as PtCo, PdCo, or the like; or the like is preferable. By "platinum family" is here meant the elements Ru, Rh, Pd, Os, Ir and Pt.

The Curie temperature of the intermediate layer 3 is set to be lower than those of the first and second magnetic layers, and to be high enough to mediate exchange-coupling between the reproducing layer 1 and the recording layer 2 upon reproduction. More specifically, the Curie temperature of the intermediate layer 3 is set to be at least 100° C. or higher, preferably, 220° C. or lower, and more preferably, 200° C. or lower. A composition having a large in-plane anisotropy at room temperature is preferably used to enhance in-plane anisotropy of the reproducing layer 1 in a low-temperature region near room temperature since the verification characteristics and reproduction characteristics are improved.

As the material of the intermediate layer 3, a rare earth-iron family amorphous alloy such as GdCo, GdFeCo, GdTbFeCo, GdDyFeCo, or the like is preferable.

An element such as Cr, Al, Ti, Pt, Nb, or the like may be added to the reproducing layer 1, intermediate layer 3, and recording layer 2 to improve their corrosion resistances.

In order to enhance the interference effect, a layer consisting of a dielectric such as SiN, $AlO_x$, $TaO_x$, $SiO_x$, or the like may be added in addition to the above-mentioned three layers. In order to improve thermal conductivity, a layer consisting of, e.g., Al, AlTa, AlTi, AlCr, Cu, or the like may be formed to obtain a steep temperature gradient upon recording, thereby improving the precision of a verification signal or improving the wedge-shaped magnetic domain shape by the magnetic field modulation recording.

Furthermore, an auxiliary recording layer and an auxiliary reproducing layer may be formed to adjust the exchange coupling force or magnetostatic coupling force. Moreover, a protective coat consisting of the above-mentioned dielectric layer or a polymer resin may be added as a protective film.

The recording/reproduction process of the present invention will be described below.

Figure 4A:
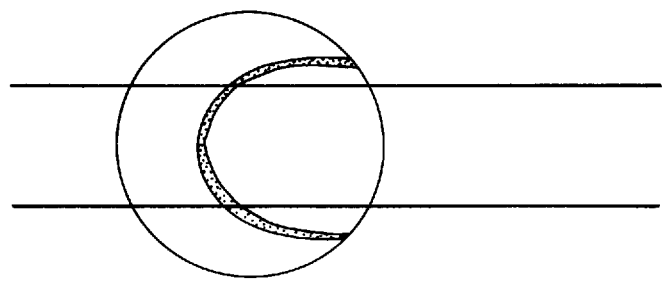
Figure 4B:
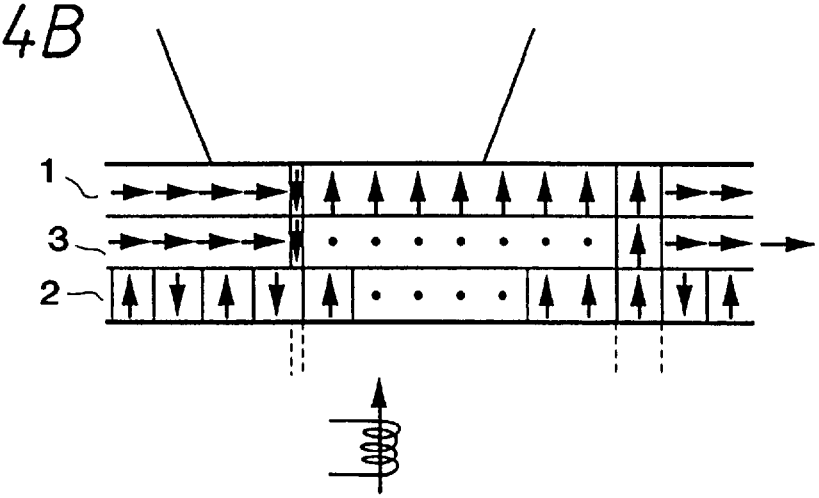
Figure 4C:
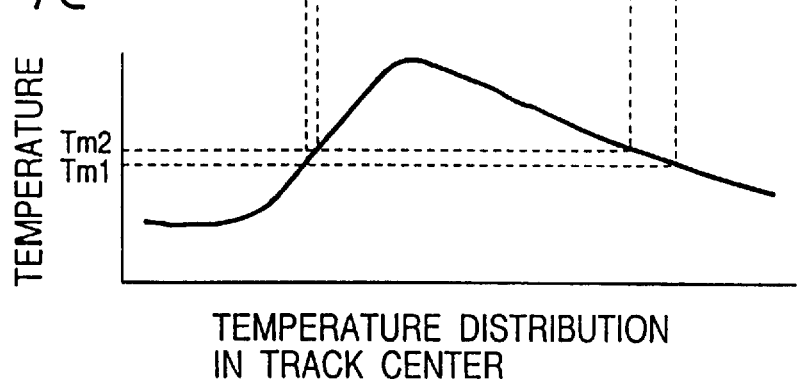

A method of verifying recorded information simultaneously with recording will be described below with reference to FIGS. 4A to 4C. FIG. 4A shows a verification signal detection region and a mask region in a light spot on a track upon recording, FIG. 4B shows the magnetization states of the magnetic layers upon recording with the disk traveling direction indicated by the arrows, and FIG. 4C shows the temperature distribution in the track direction upon recording. FIGS. 4A and 4B correspond to the &2temperature distribution shown in FIG. 4C. FIG. 4A shows an old information mask region (on the left in the drawing) separated by an old information detection region from a new information detection region (on the right in the drawing).

As in the above-mentioned prior art, in the magneto-optical recording medium of the present invention as well, as shown in FIG. 4C, the temperature distribution formed upon irradiation of a laser beam onto the medium extends in the traveling direction of the medium. A temperature $Tm_1$ in FIG. 4C is a temperature at which the reproducing layer 1 changes from an in-plane magnetization film to a perpendicular magnetization film, and a temperature $Tm_2$ is the Curie temperature of the intermediate layer 3. Therefore, since the reproducing layer 1 has an in-plane magnetization film within a temperature region from room temperature to $Tm_1$, it optically masks old information in the recording layer 2 in this temperature region. More specifically, old information is not detected unlike in the prior art.

In a temperature region equal to or higher than $Tm_2$, since the magnetization of the intermediate layer 3 disappears, and the exchange coupling force between the reproducing layer 1 and the recording layer 2 is cut off, the magnetization of the reproducing layer 1 easily aligns in the direction of an external magnetic field. For this reason, this temperature region serves as a verification signal detection region for detecting new information.

In a temperature region from $Tm_1$ to $Tm_2$, the reproducing layer 1 becomes a perpendicular magnetization film, and is exchange-coupled to the recording layer 2, so that old information in the recording layer 2 is transferred to the reproducing layer 1. However, since this temperature region from $Tm_1$ to $Tm_2$ is set or can be set to provide the super-resolution effect as a region narrower than the light spot upon reproduction, as will be described later, it has a very small width upon recording with higher power and a steeper temperature gradient than those upon reproduction.

Therefore, in the information recording method of the present invention, since nearly all old information is masked by the reproducing layer 1, and new information is preferentially detected in the light spot, as shown in FIG. 4A, a reliable verification signal can be obtained.

After irradiation of a laser spot, the magnetization of the recording layer 2 appears before the temperature of the recording layer 2 returns to room temperature. When the temperature falls to $Tm_2$, the magnetization of the intermediate layer 3 appears. Then, the exchange-coupling force acts between the reproducing layer 1 and the recording layer 2, and the direction of magnetization of the recording layer 2 is oriented in a direction magnetically stable with respect to the reproducing layer 1.

In this manner, when the direction of magnetization of the reproducing layer 1 is detected using reflected light of a recording beam upon reproduction, it is verified that information according to magnetic field modulation is written in the recording layer.

Note that FIGS. 4A to 4C illustrate the verification method under the assumption that the directions of (net) magnetization of the reproducing layer 1 and the recording layer 2 respectively match the directions of spins of an element (e.g., the spins of the iron family element) which positively contribute to exchange coupling. However, these directions need not always match.

For example, when each of the reproducing layer 1 and the recording layer 2 consists of a rare earth-iron family ferromagnetic member, the type of medium is classified into two types depending on the type of dominant element. When both the first and second magnetic layers are TM (iron family element) sublattice magnetization dominant or, conversely, are RE (rare earth element) sublattice magnetization dominant, the medium is called a P type. On the other hand, when the first magnetic layer is TM sublattice magnetization dominant and the second magnetic layer is RE sublattice magnetization dominant, or vice versa, the medium is called an A type. The reproducing layer 1 and the recording layer 2 shown in FIGS. 4A to 4C correspond to a P type medium.

In contrast to this, in the case of the A type, when the reproducing layer 1 and the recording layer 2 are exchange-coupled to each other via the intermediate layer 3, the direction of magnetization of the recording layer 2 is opposite to that of the external magnetic field. For this reason, even when the temperature of a medium portion falls after irradiation of a laser beam upon recording, and the recording layer 2 is exchange-coupled to the reproducing layer 1 via the intermediate layer 3, if the external magnetic field is applied, the exchange-coupling force must be dominant compared to the external magnetic field. A condition for satisfying this requirement is expressed by relation I below:

$$\sigma_w/(2\ Ms_2 \cdot h_2) - Hc_2 > Hb \tag{I}$$

where $\sigma_w$ is the exchange-coupling energy between the reproducing layer 1 and the recording layer 2 at that time, $Ms_2$ is the saturation magnetization of the recording layer 2, $h_2$ is the film thickness of the recording layer 2, $Hc_2$ is the coercive force of the recording layer 2, and Hb is the external magnetic field.

In the case of the P type medium, since the effective magnetic field based on exchange-coupling matches the direction of the external magnetic field, the conditions of relation I need not be satisfied.

The reproduction method of a recorded signal will be described below.

Figure 5A:
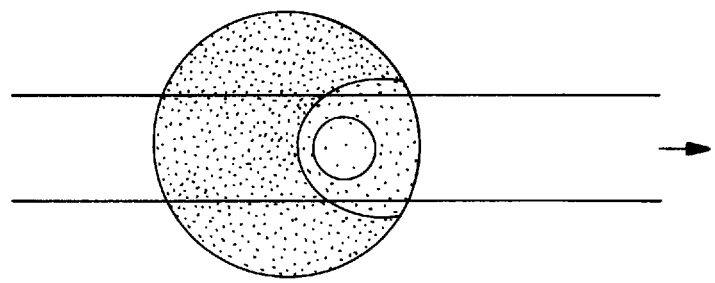
Figure 5B:
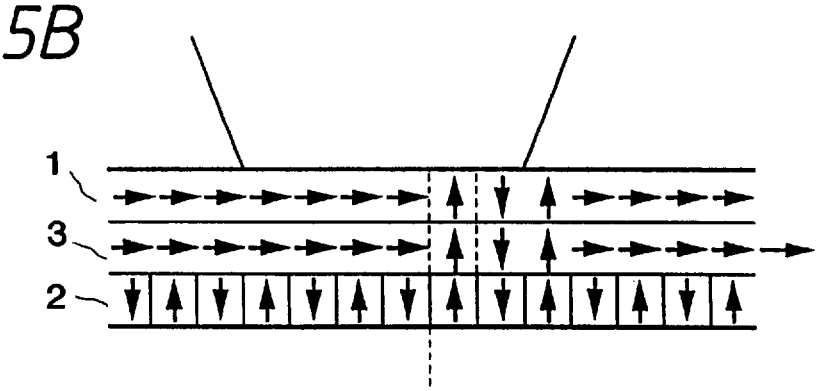
Figure 5C:
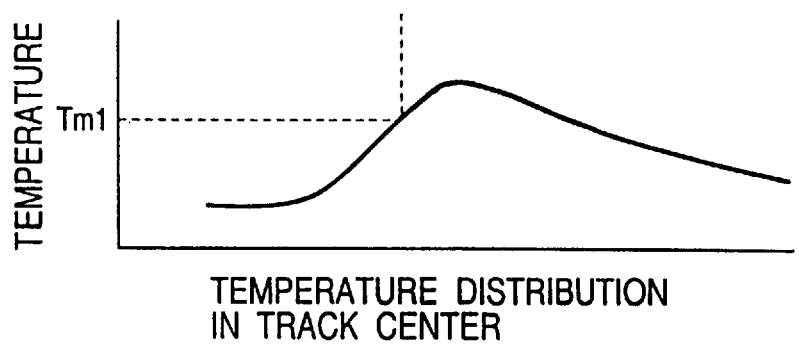

FIGS. 5A to 5C respectively show the light spot, spin state, and temperature distribution upon reproduction of the magneto-optical recording medium of the present invention. FIG. 5A shows a light spot on a track. The light spot includes a mask region (major portion) and a mask within an aperture region.

Upon reproduction, a light beam is irradiated onto the medium, and the temperature of the irradiated portion rises at that time. Since the medium moves at a constant speed, the temperature distribution on the medium extends in the moving direction of the medium, as shown in FIG. 5C, and includes a high-temperature portion in the light spot.

As shown in FIG. 5C, since the reproducing layer 1 changes from an in-plane magnetization film to a perpendicular magnetization film at a temperature equal to or higher than $Tm_1$, a state wherein only the high-temperature portion of the reproducing layer 1 has become a perpendicular magnetization film, and the remaining portion remains an in-plane magnetization film is realized. Since the reproducing layer portion, which has become a perpendicular magnetization film, is magnetically exchange-coupled to the recording layer 2, the magnetization of the recording layer 2 is transferred to the reproducing layer portion. The transferred magnetic signal is converted into an optical signal by the magneto-optical effect of the reproducing layer 1, and the optical signal is detected. Therefore, as shown in FIG. 5A, since a portion of the light spot serves as an aperture region for transferring the magnetization (recorded mark) of the recording layer, and the remaining portion serves as a mask region for optically masking magnetization information in the recording layer, a signal having a period equal to or smaller than the diffraction limit of light can be reproduced.

Figure 6A:
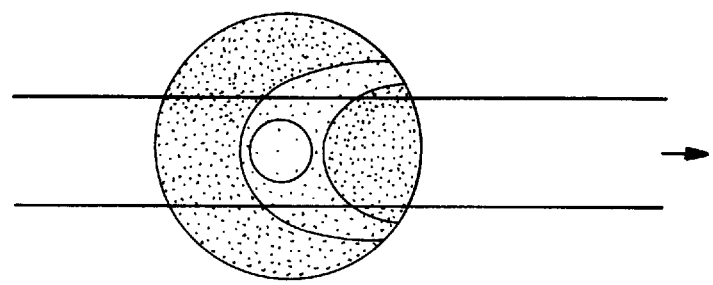
Figure 6B:
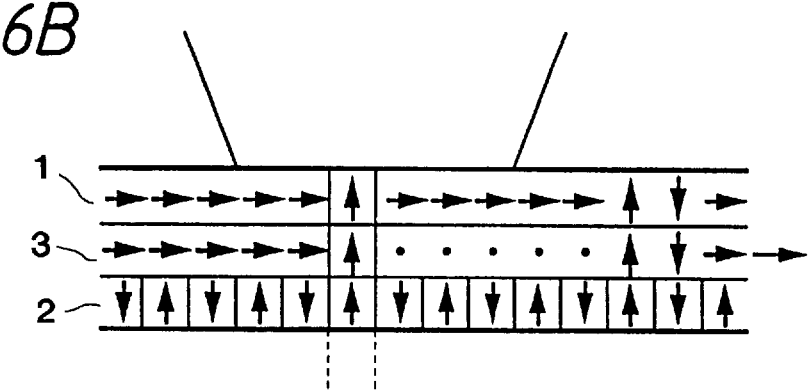
Figure 6C:
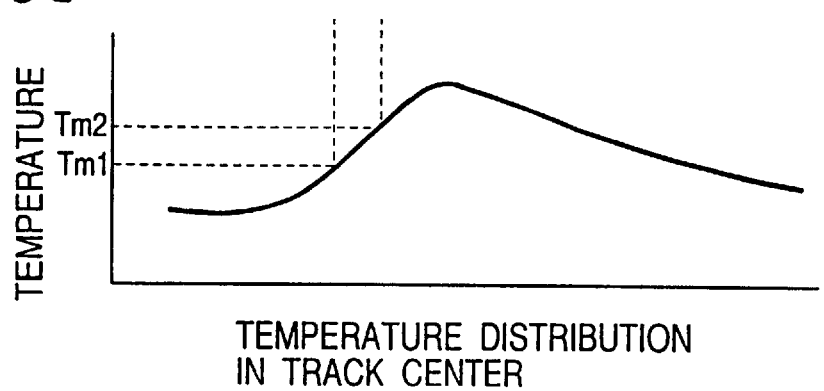

When the temperature of the highest-temperature region in the spot of the reproducing laser beam is adjusted to be equal to the Curie temperature $Tm_2$ of the intermediate layer 3 by increasing the reproducing power or decreasing the Curie temperature of the intermediate layer 3, so that the reproducing layer 1 returns to an in-plane magnetization film upon cutting off of the exchange coupling force from the recording layer 2, the magnetization of the recording layer 2 can be transferred in only the intermediate region in the light spot. The width of this intermediate region, in other words, the temperature region from $Tm_1$ to $Tm_2$ is preferably narrowed to a degree not to reduce the signal output, so as to realize a super-resolution. FIGS. 6A to 6C respectively show the detection regions of the light spot, spin state, and temperature distribution at that time. As with FIG. 5A, FIG. 6A shows a light spot on a track. The light spot includes a mask region (major portion) and a mask within an aperture region. In the above description, the reproducing layer 1 portion has an in-plane magnetization film in the mask region in the high-temperature portion. Alternatively, a mask may be formed by arranging a recorded mark magnetic domain in the high-temperature region.

In the above description, the reproducing layer 1 and the recording layer 2 are magnetically coupled to each other by the exchange coupling effect. Alternatively, the recording layer 2 and the reproducing layer 1 may be magnetically coupled to each other by magnetostatic coupling upon reproduction.

When the magneto-optical recording medium of the present invention, and the information recording method, verifying method, and reproduction method using the medium are used, high-speed recording can be realized while assuring sufficient reliability, and high-density recording can also be realized.

The present invention will be described in detail below by way of its experimental examples. However, the present invention is not limited to these experimental examples.

(Experimental Example 1)

Si, Gd, Tb, Fe, Co, and Al targets were attached to a DC magnetron sputtering apparatus, and a glass substrate having a diameter of 130 mm and a polycarbonate substrate with lands and grooves at a pitch of 1.6 μm were fixed to a substrate holder which was set at a position separated from the respective targets by a distance of 150 mm. Thereafter, the interior of the chamber was evacuated by a cryopump to a high vacuum of $1 \times 10^{-5}$ Pa or less.

Figure 7:
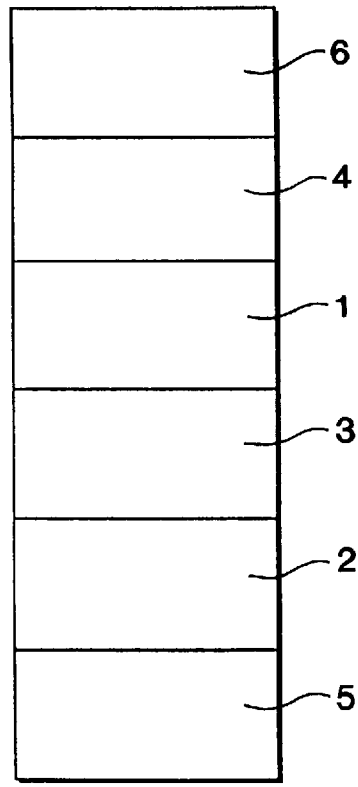
FIG. 7 is a sectional view showing an example of the layer structure of the magneto-optical recording medium according to the present invention.

During the evacuation, Ar gas was supplied into the chamber to 0.4 Pa, and thereafter, an 800-Å thick SiN dielectric layer 4, a 400-Å thick GdFeCo reproducing layer 1, a 100-Å thick GdFeCoAl intermediate layer 3, a 400-Å thick TbFeCo recording layer 2, and a 700-Å thick SiN protective layer 5 were formed in the order named on the substrate 6, thus obtaining a sample with the structure shown in FIG. 7. Upon formation of each SiN layer, $N_2$ gas was supplied in addition to the Ar gas, and the SiN layer was formed by DC reactive sputtering. In this case, the mixing ratio of the Ar and $N_2$ gases was adjusted to obtain a refractive index of 2.15.

The composition of the GdFeCo reproducing layer was selected to be RE rich at room temperature, and to have an Ms of 220 emu/cc, a compensation temperature of 240° C., and a Curie temperature of 300° C. or more.

The composition of the GdFeCoAl intermediate layer was selected to be RE rich at room temperature, and to have an Ms of 400 emu/cc, and a Curie temperature of 170° C.

The composition of the TbFeCo recording layer was selected to be TM rich at room temperature, and to have a Curie temperature of 220° C.

The Kerr rotation angle was measured by irradiating a laser beam of 830 nm from the reproducing layer side while applying a magnetic field onto the magneto-optical recording medium in the direction of its film thickness. As a result, it was found that when the temperature fell within a range from room temperature to at least a temperature in the neighborhood of 110° C., and the magnetic field was zero, the Kerr rotation angle was zero, and the reproducing layer was an in-plane magnetization film.

Then, a verification signal was measured simultaneously with the magnetic field modulation overwrite using this magneto-optical recording medium. In an evaluation device, the N.A. of an objective lens was 0.55, the laser wavelength was 780 nm, and the linear velocity was 9 m/s.

Figure 8A:
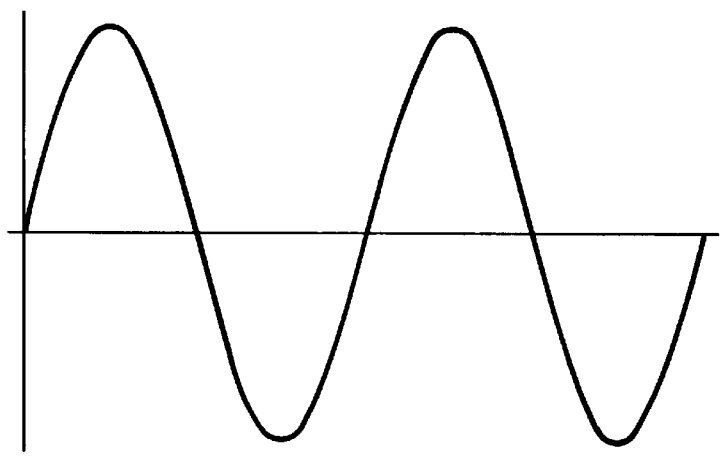
Figure 8B:
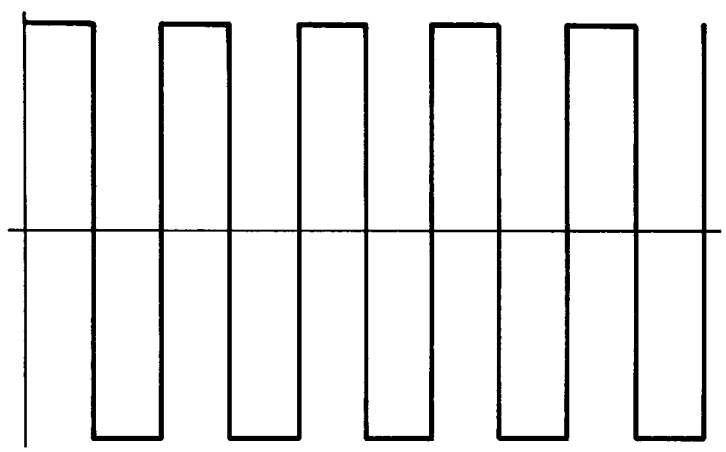
Figure 8C:
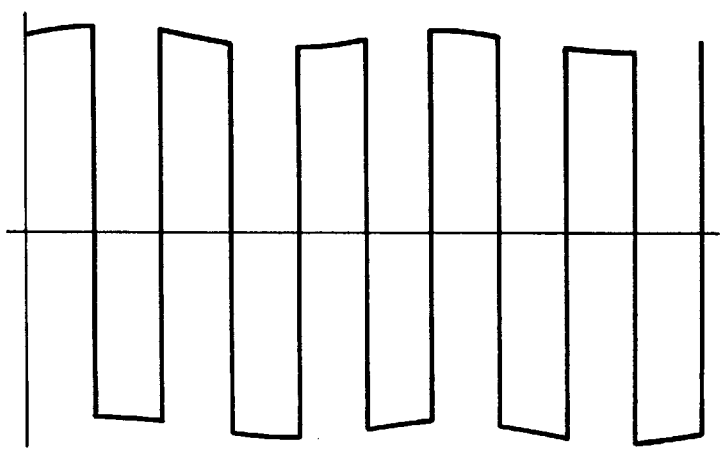

After a magnetic field of 500 oe was applied in the erasing direction prior to measurement, a magnetic field of 400 Oe was applied in the recording direction, and a rectangular wave signal of 4 MHz was recorded by a recording power of 12 mW. FIG. 8A shows a reproduced waveform obtained by reproducing the recorded signal by irradiating a laser beam of 2 mW after recording. Thereafter, an external magnetic field of ±200 Oe was applied, and a rectangular wave signal of 10 MHz (FIG. 8B) was overwrite-recorded by the magnetic field modulation overwrite. FIG. 8C shows a signal obtained from reflected light of a recording beam in the overwrite operation based on magnetic field modulation. As can be seen from FIG. 8C, a verification signal which corresponds well to the modulated external magnetic field is obtained.

After the signal of 10 MHz was overwritten, the recorded signal was reproduced by a laser power of 2.8 mW without applying any magnetic field. As a result, a C/N ratio of 48 dB was obtained. The mark length at that time was 0.45 μm, and as can be seen from this result, super-resolution reproduction was satisfactorily performed. A mark of 1.6 μm was recorded on a land portion, and the difference between the carrier levels of this land portion and a neighboring groove portion from which data had already been erased was measured. As a result, a value of 30 dB or higher was obtained. As can be seen from this measurement result, crosstalk did not take place.

(Experimental Example 2)

Using the same apparatus and method as in Experimental Example 1, an 800-Å thick SiN dielectric layer, a 400-Å thick GdFeCo reproducing layer, an 80-Å thick GdFe intermediate layer, a 300-Å thick TbFeCo recording layer, and a 700-Å thick SiN protective layer were formed on a polycarbonate substrate in the order named, thus obtaining a sample with a structure shown in FIG. 7.

The composition of the GdFeCo reproducing layer was selected to be RE rich at room temperature, and to have an Ms of 240 emu/cc, a compensation temperature of 235° C., and a Curie temperature of 300° C. or more.

The composition of the GdFe intermediate layer was selected to be RE rich at room temperature, and to have an Ms of 450 emu/cc, and a Curie temperature of 200° C.

The composition of the TbFeCo recording layer was selected to be TM rich at room temperature, and to have a Curie temperature of 200° C.

The Kerr rotation angle was measured by irradiating a laser beam of 830 nm from the reproducing layer side while applying a magnetic field onto the magneto-optical recording medium in the direction of its film thickness. As a result, it was found that when the temperature fell within a range from room temperature to at least a temperature in the neighborhood of 110° C., and the magnetic field was zero, the Kerr rotation angle was zero, and the reproducing layer was an in-plane magnetization film.

Then, the magnetic field modulation recording and verification operations were performed under the following conditions using the same measurement apparatus as in Experimental Example 1.

Figure 9A:
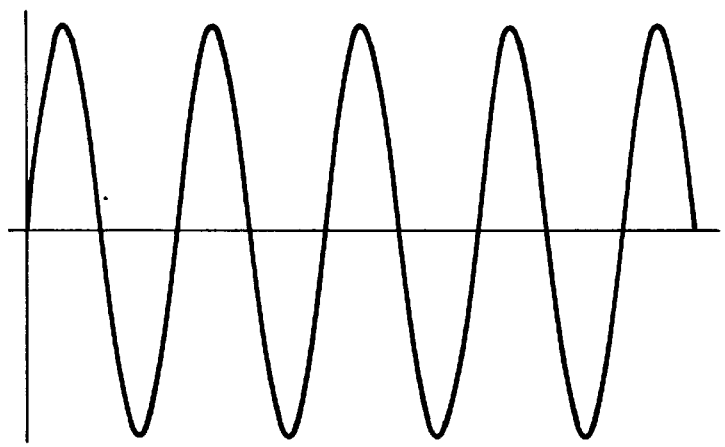
Figure 9B:
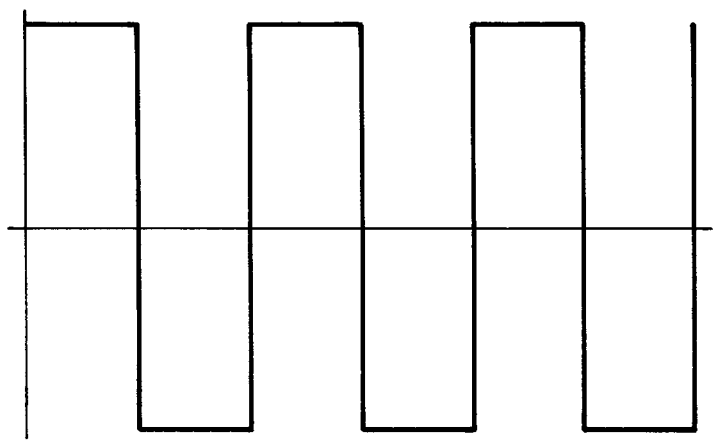

After a magnetic field of 500 Oe was applied in the erasing direction prior to measurement, a magnetic field of 500 Oe was applied in the recording direction, and a rectangular wave signal of 9 MHz was recorded by a recording power of 13 mW. FIG. 9A shows the reproduced waveform obtained by reproducing the recorded signal by irradiating a laser beam of 2 mW after recording. Thereafter, an external magnetic field of ±200 Oe was applied while being modulated, and a rectangular wave signal of 6 MHz shown in FIG. 9B was overwrite-recorded by the magnetic field modulation overwrite.

Figure 9C:
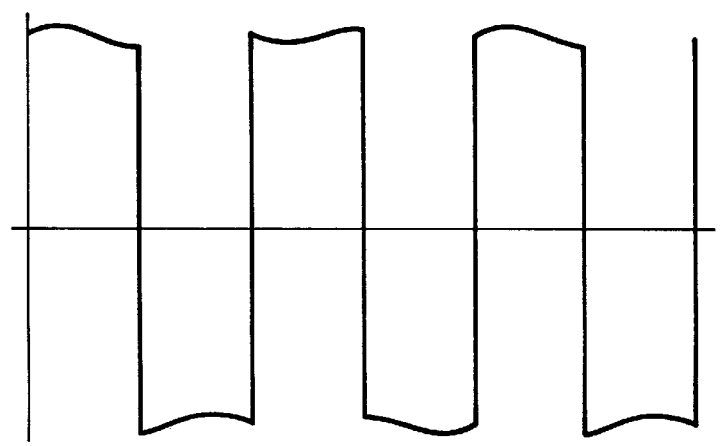

FIG. 9C shows a signal obtained from reflected light of a recording beam in the overwrite operation based on magnetic field modulation. As can be seen from FIG. 9C, a verification signal which corresponds well to the modulated external magnetic field is obtained.

(Comparative Example 1)

Using the same film formation apparatus and method as in Experimental Example 1, a 900-Å thick SiN dielectric layer, a 400-Å thick GdFeCo reproducing layer, a 400-Å thick TbFeCo recording layer, and a 700-Å thick SiN protective layer were similarly formed on a glass substrate in the order named, thus obtaining a magneto-optical recording medium. The refractive index of each SiN layer was set to be 2.1.

The composition of the GdFeCo reproducing layer was selected to be TM rich at room temperature and to have a Curie temperature of 300° C. or more.

The composition of the TbFeCo recording layer was selected to be TM rich at room temperature and to have a Curie temperature of 220° C.

The Kerr rotation angle was measured by irradiating a laser beam of 830 nm from the reproducing layer side while applying a magnetic field onto the magneto-optical recording medium in the direction of its film thickness. As a result, it was found that when the temperature fell within a range from room temperature to at least a temperature around 110° C., and the magnetic field was zero, the Kerr rotation angle was 10 or more, and the reproducing layer was a perpendicular magnetization film.

Figure 10A:
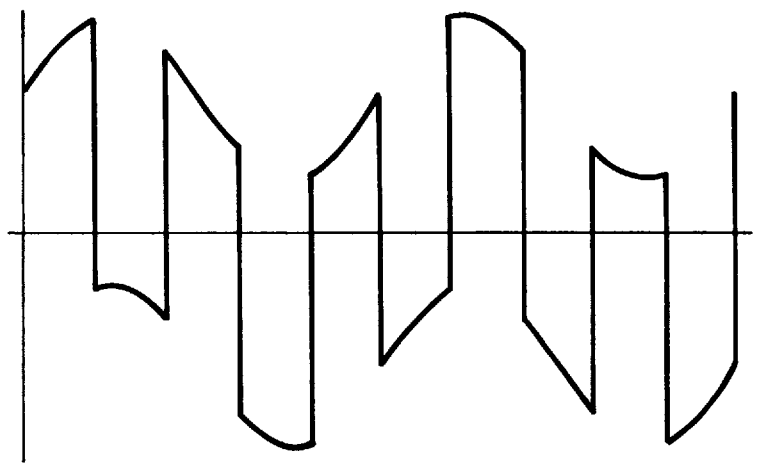
FIGS. 10A and 10B are waveform charts showing the verifying operation of a magneto-optical recording medium of Comparative Example 1.

Using this magneto-optical recording medium, old information was written by the same apparatus, linear velocity, and frequency (4 MHz) as in Experimental Example 1, and a verifying operation was observed while recording new information at the same frequency (10 MHz) by the magnetic field modulation overwrite. FIG. 10A shows a verification signal obtained at that time.

Figure 10B:
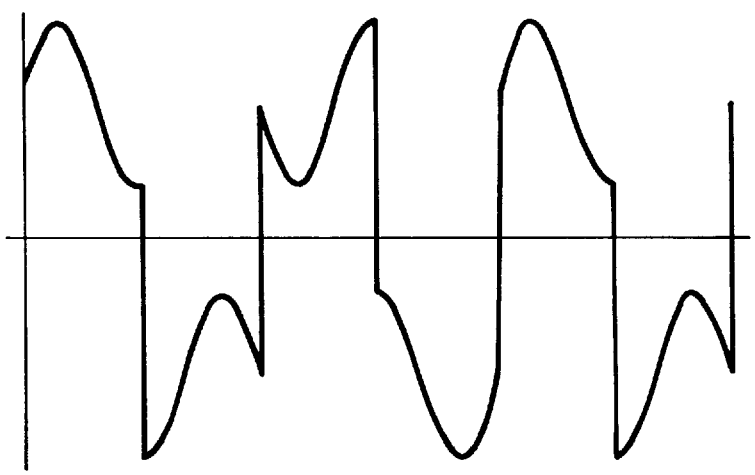

Similarly, old information was written by the same apparatus, linear velocity, and frequency (9 MHz) as in Experimental Example 2, and a verifying operation was observed while recording new information at the same frequency (6 MHz) by the magnetic field modulation overwrite. FIG. 10B shows a verification signal obtained at that time.

As can ben seen from FIGS. 10A and 10B, in this medium, the old information overlaps the verification signal, and the verifying operation of the new information yields only an uncertain result.

After a signal of 10 MHz was overwritten by the same operation as in Experimental Example 1, the recorded signal was reproduced by laser power falling in a range from 2.8 mW to 3.5 mW. In this case, a maximum C/N ratio was 21 dB. Therefore, it was found that super-resolution reproduction could not be performed in this medium.

(Comparative Example 2)

Using the same film formation apparatus and method as in Experimental Example 1, a 900 Å thick SiN dielectric layer, a 400-Å thick GdFeCo reproducing layer, a 100-Å thick TbFeCoAl intermediate layer, a 400-Å thick TbFeCo recording layer, and a 700-Å thick SiN protective layer were similarly formed on a glass substrate in the order named, thus obtaining a magneto-optical recording medium. The refractive index of each SiN layer was set to be 2.1.

The composition of the GdFeCo reproducing layer was selected to be TM rich at room temperature, and to have a saturation magnetization of 100 emu/cc and a Curie temperature of 300° C. or more.

The composition of the TbFeCoAl intermediate layer was selected to be TM rich at room temperature, and to have a Curie temperature of 140° C.

The composition of the TbFeCo recording layer was selected to be TM rich at room temperature, and to have a saturation magnetization of 200 emu/cc and a Curie temperature of 220° C.

The Kerr rotation angle was measured by irradiating a laser beam of 830 nm from the reproducing layer side while applying a magnetic field onto the magneto-optical recording medium in the direction of its film thickness. As a result, it was found that when the temperature fell within a range from room temperature to at least a temperature around 110° C., and the magnetic field was zero, the Kerr rotation angle was 1° or more, and the reproducing layer was a perpendicular magnetization film.

Figure 11A:
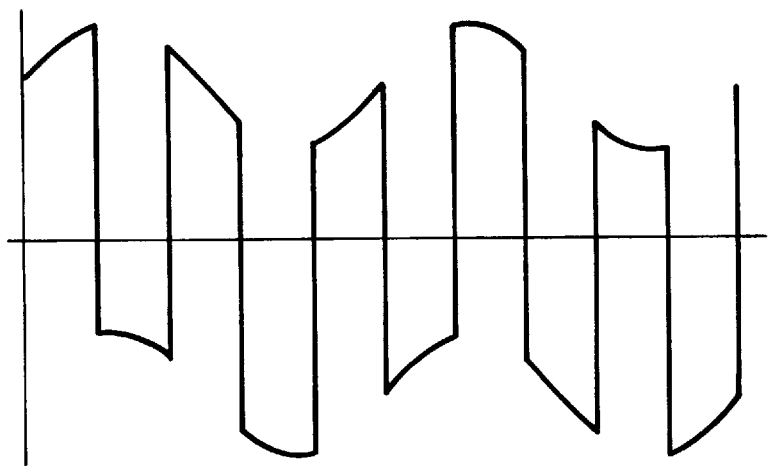
FIGS. 11A and 11B are waveform charts showing the verifying operation of a magneto-optical recording medium of Comparative Example 2.

Using this magneto-optical recording medium, old information was written by the same apparatus, linear velocity, and frequency (4 MHz) as in Experimental Example 1, and a verifying operation was observed while recording new information at the same frequency (10 MHz) by the magnetic field modulation overwrite. FIG. 11A shows a verification signal obtained at that time.

Figure 11B:
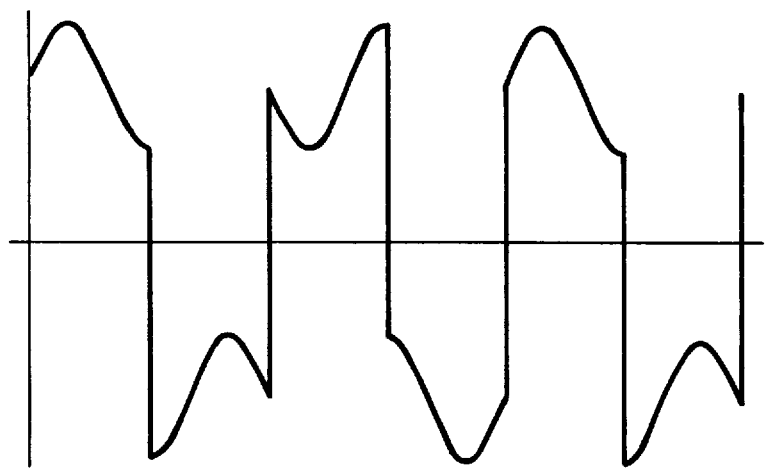

Similarly, old information was written by the same apparatus, linear velocity, and frequency (9 MHz) as in Experimental Example 2, and a verifying operation was observed while recording new information at the same frequency (6 MHz) by the magnetic field modulation overwrite. FIG. 11B shows a verification signal obtained at that time.

As can be seen from FIGS. 11A and 11B, in this medium, the old information overlaps the verification signal, and the verifying operation of the new information provides only an uncertain result.

After a signal of 10 MHz was overwritten by the same operation as in Experimental Example 1, the recorded signal was reproduced by laser power falling in a range from 2.8 mW to 3.5 mW without applying a magnetic field. In this case, a maximum C/N ratio was 22 dB. When an external magnetic field of 800 Oe was applied, a C/N ratio of 40 dB was obtained. However, when crosstalk with a neighboring land portion was examined by the same operation as in Experimental Example 1, the C/N ratio was 10 dB or less. Thus, it was found that super-resolution reproduction could not be performed when no reproducing magnetic field was applied, and if applied, the density in the track direction could not be improved.

According to the magneto-optical recording medium and the information recording method of the present invention, crosstalk with old information can be greatly eliminated upon recording, and a reliable verification signal can be simultaneously obtained. At the same time, a super-resolution capable of improving the line density and track density can be realized without using an initialization magnetic field and a reproducing magnetic field.

What is claimed is:

1. A method of recording information on a magneto-optical recording medium comprising (i) a substrate, (ii) a first magnetic layer which is an in-plane magnetization layer at room temperature and becomes a perpendicular magnetization layer at a temperature between room temperature and the Curie temperature thereof, (iii) a second magnetic layer for storing information, the second magnetic layer being a perpendicular magnetization layer at a temperature between room temperature and the Curie temperature thereof, and (iv) a third magnetic layer having a Curie temperature which is lower than those of the first and second magnetic layers, wherein the first, third and second magnetic layers are laminated on the substrate in the named order, said method comprising the steps of:

irradiating a recording laser spot on the recording medium, wherein the first magnetic layer is an in-plane magnetization film in a low temperature region inside a region irradiated by the spot while in a high temperature region inside a region irradiated by the spot, the first magnetic layer is a perpendicular magnetization layer and the third magnetic layer reaches a temperature equal to at least the Curie temperature thereof so as to block an exchange-coupling force acting between the first and second magnetic layers;

applying an external magnetic field modulated in accordance with recording information so as to orient the magnetization of the first magnetic layer in the high temperature region in a direction the same as that of the external magnetic field;

detecting a light of the recording laser spot reflected from the medium to verify the information to be recorded while applying said external magnetic field; and orienting the magnetization of the second magnetic layer in a magnetically stable direction with respect to the magnetization of the first magnetic layer so as to record information into the second magnetic layer, after the irradiation of the laser spot when the magnetization of the third magnetic layer is restored to cause the exchange-coupling force to act between the first and second magnetic layers.

2. A method according to claim 1, wherein when the first magnetic layer is an iron-group element sublattice magnetization dominant and the second magnetic layer is a rare-earth element sublattice magnetization dominant, the external magnetic field (Hb) satisfies the following condition, $$\sigma_w/(2Ms \cdot h) - Hc > Hb$$

where $\sigma_w$ is the exchange-coupling energy acting between the first and second magnetic layers, Ms is the saturation magnetization of the second magnetic layer, h is the film thickness of the second magnetic layer, and Hc is the coercive force of the second magnetic layer.

3. A method according to claim 1, wherein when the first magnetic layer is a rare-earth element sublattice magnetization dominant and the second magnetic layer is an iron-group element sublattice magnetization dominant, the external magnetic field (Hb) satisfies the following condition, $$\sigma_w/(2Ms \cdot h) - Hc > Hb$$

where $\sigma_w$ is the exchange-coupling energy acting between the first and second magnetic layers, Ms is the saturation magnetization of the second magnetic layer, h is the film thickness of the second magnetic layer, and Hc is the coercive force of the second magnetic layer.

* * * * *